United States Patent [19]

Green

[11] 4,026,028

[45] May 31, 1977

[54] CABLE CUTTING DEVICE

[75] Inventor: Cyril Robert Green, Honesdale, Pa.

[73] Assignees: Mario D. Medio; Grace E. Medio, both of Malverne, N.Y.

[22] Filed: July 31, 1975

[21] Appl. No.: 600,872

[52] U.S. Cl. .................................. 30/233; 30/241
[51] Int. Cl.² ................ B26B 29/00; B23D 29/00
[58] Field of Search ........... 30/180, 228, 233, 295, 30/286, 241, 90.1, 92

[56] References Cited

UNITED STATES PATENTS

| | | | |
|---|---|---|---|
| 1,069,486 | 8/1913 | Smith | 30/286 |
| 1,320,191 | 10/1919 | Ash | 30/286 X |
| 2,716,813 | 9/1955 | Smyres | 30/228 |
| 3,003,235 | 10/1961 | Temple | 30/180 |
| 3,267,573 | 8/1966 | Hill | 30/228 |
| 3,474,533 | 10/1969 | Peck | 30/233 X |
| 3,840,987 | 10/1974 | Netta | 30/241 X |

*Primary Examiner*—Al Lawrence Smith
*Assistant Examiner*—J. C. Peters
*Attorney, Agent, or Firm*—Bauer, Amer & King

[57] ABSTRACT

A lightweight cable cutter is fluid pressure operated and effects a shearing of the cable by two opposed blades. A dielectric shroud covers the blades and during operation, a part of the shroud moves to expose one of the blades. The blades are configured to capture the cable periphery.

13 Claims, 3 Drawing Figures

U.S. Patent  May 31, 1977  4,026,028
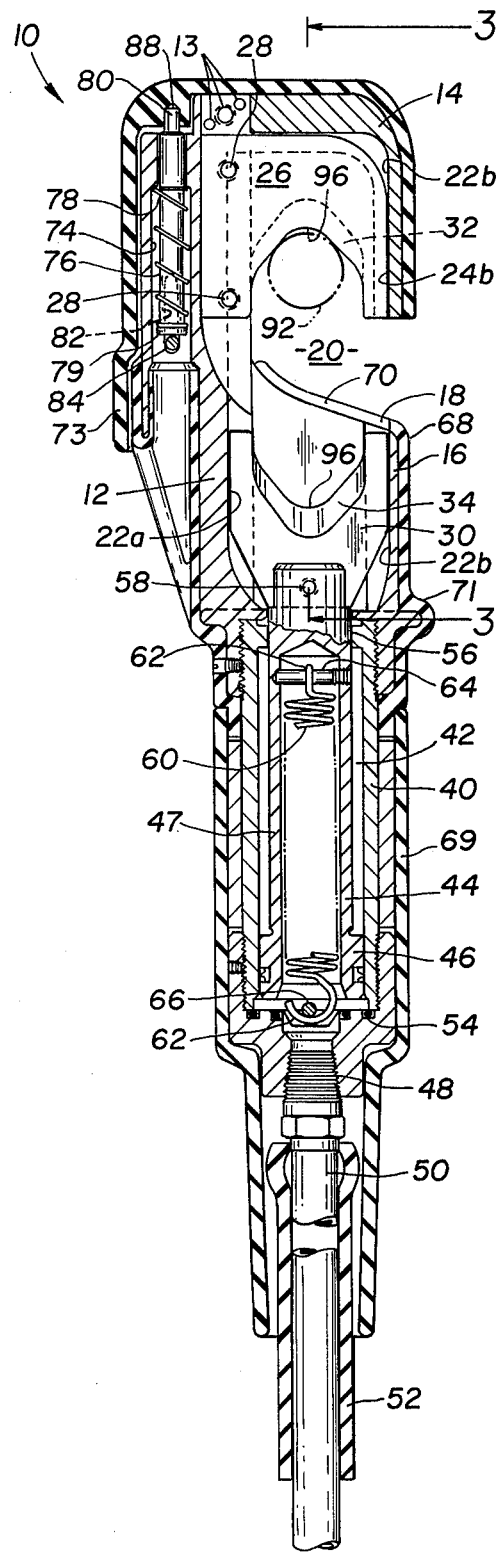
FIG.2
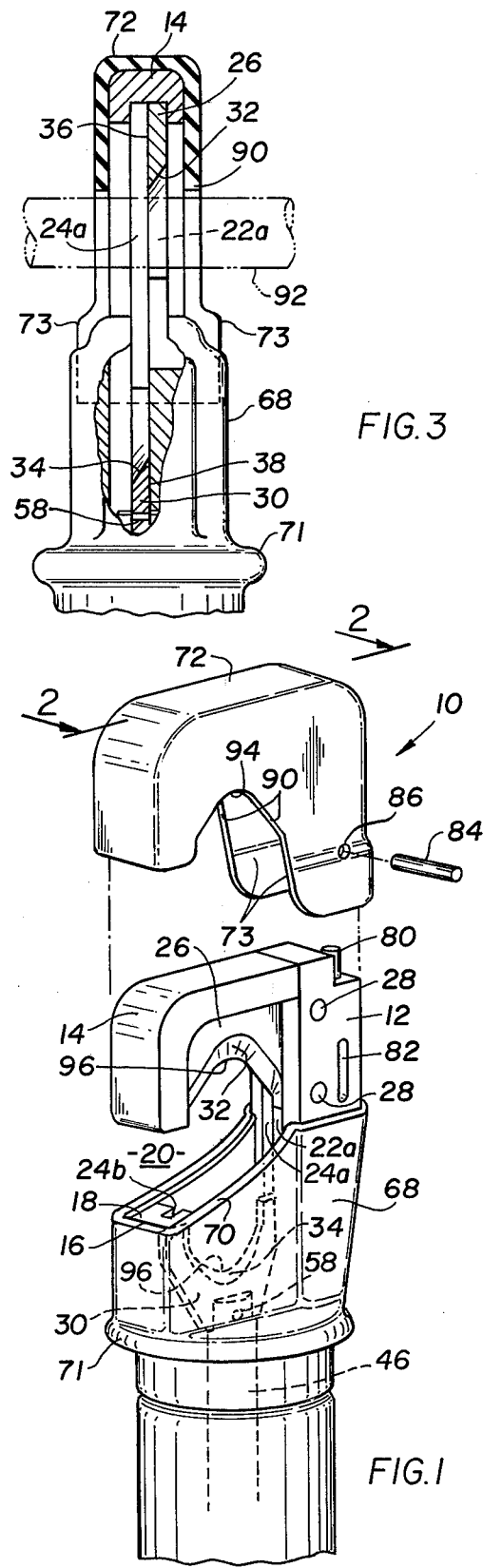
FIG.3
FIG.1

CABLE CUTTING DEVICE

This invention relates to a cable cutting tool, and in particular, one that is adapted to shear electrical cable above and below ground and can be used to cut rope as well.

In splicing and repairing of electrical cables, it is oftentimes necessary to position the cutting head remote from the user. This is normally accomplished by placing the head on a pole or shaft and employing means for remote actuation of the cutting elements. Because prior cutting heads tend to be relatively massive and heavy, worker fatigue is a problem. The tool should be lightweight but strong enough to effect an accurate, relatively smooth, distortion-free shearing of the cable.

Further, it would be desirable to provide means to protect the user by covering the cutting elements or blades when in use and retracting them when not in use and allow the cutting device to be moved along the cable without having the cutting elements snag or catch on the cable as it is being positioned for use. Of course, covering the operative cutting elements presents an obvious safety advantage over those cutting knives that are exposed during use. It is desirable that a high degree of electrical isolation be maintained between the user and the cutting device to prevent accidental electrical shock from a live cable.

The present invention employs a lightweight streamlined cutting head. Shearing action is accomplished by two opposed blades movable in relation to one another. When not in use, each blade is covered by or recessed in an insulating shroud part. The cable is placed between and rests on the shrouds. On command, fluid pressure effects relative blade movement causing severing of the cable. The blades are configured so that the reactive thrust of one cancels the reactive thrust of the other.

It is, therefore, an object of the present invention to provide a lightweight cable cutting tool.

It is another object of the present invention to provide a cable cutter affording a high degree of electrical insulation.

It is a further object of the present invention to provide an electrical cable cutting device operable to effect an accurate and relatively smooth shearing of the cable without the use of explosively activated means.

It is a still further object of the present invention to provide a cable cutting device employing means to store the cutting blades in a covered or retracted position and wherein this storing means presents a bearing surface on which the cable may be supported.

It is yet another object of the invention to provide a cutting device for cables employing two cutting surfaces to thereby distribute the cutting forces and in so doing cancel the thrust of one blade with the reactive thrust of the other.

Other objects and features of the present invention will become apparent from the following detailed description considered in connection with the accompanying drawings. It is to be understood, however, that the drawings are designed for purposes of illustration only and not as a definition of the limits of the invention for which reference should be made to the claims.

In the drawings, wherein the same reference numeral denotes the same element throughout the several views:

FIG. 1 is a perspective view of the inventive cable cutter;

FIG. 2 is a longitudinal sectional view taken in the direction of arrows 2—2 of FIG. 1; and FIG. 3 is an elevational view of the top portion of the cutter, a portion of which is seen in section along the line 3—3 of FIG. 2 and another portion of which is broken away for purposes of clarity.

Referring now to the drawings, there is shown the inventive cable cutter device indicated generally by reference numeral 10. Cutter 10 includes a cutter body or housing 12 from which extends an integral upper blade support or jaw 14 that is joined thereto by pins and screws 13. Body 12 is further defined by a lower blade support or jaw portion 16 having an upper lip 18 spaced and essentially in line with the opposed facing portion of upper support 14. Lower lip 18, in conjunction with upper support 14, define an opening 20 through which the cable passes into the cutting area and operative confines of the inventive cutter which will be described hereinafter.

Body 12 is formed with a pair of elongated adjacent and parallel guide tracks 22a and 24a that extend between the upper support 14 and the lower support or jaw 16 along the vertical portion of the body. Provided on both the upper and lower supports 14 and 16 on opposite sides of opening 20 are cooperating tracks 22b and 24b. Track 22b is in lateral alignment with track 22a while track 24b is in cooperating lateral alignment with track 24a.

One of a pair of blades 26 is demountably secured in the upper jaw 14 by screws or pins 28 and when so held, perimetric portions of the blade are received and supported against movement and flexing in slots or tracks 22a and 22b. The other blade 30 is slidably mounted in and supported initially in support 16. As shown, perimetric edge portions of blade 30 are slidably captured and constrained in the slots formed by tracks 24a and 24b. Each blade 26 and 30 has, on one side thereof, a respective sloping knife cutting or shearing surface 32 and 34. The surfaces 32 and 34 are oppositely disposed while the back sides 36 and 38 of each blade are relatively smooth as to be in planar wiping engaging and supporting relationship with each other.

The cutter device 10 further includes a lower part 40 formed with a cylinder working space 42 in which a relatively movable piston 44, having a connecting flange or extension 46 extending from one side thereof, is slidably retained. The piston 44 communicates with a fluid connector 48 that in turn is coupled to a fluid supply line 50. A remote source of pressurized fluid, the source not shown, is in communication with line 50 and is thus operable to pressurize the piston 44. Although a pressure fluid actuator is here used, those skilled in the art will recognize that other actuators as mechanical screws or levers as well as explosive charges electrically operated motors or solenoids may also be used. A dielectric soft vinyl tube 52 is attached to the lower part 40 to cover and protect the fluid hose 50 to prevent its kinking which would result in damage to the hose. Sealing and packing means 54 effects fluid-tight sealing of the cylinder 40 in the housing as well as sealing piston 44 in the cylinder.

The elongated piston extends at 47 slidably through an aperture 56 in cylinder 40 and is pivotally pinned to the lower part of blade 30 by means 58. A spring or biasing element 60 has two opposed ends each formed with a spring hook 62. One end of the spring is attached to extension 47 by means of pin 64 while the other end of the pin is attached to cylinder 40 by means of pin 66. Spring 60 normally biases and urges piston 44, and hence blade 30, downwardly to a retracted mode when looking at FIG. 2.

A two-part dielectric shroud 68 and 69 insulates and fully covers the lower part of body 12 and the lower jaw 16. It will be seen with reference to FIG. 1, that shroud 68 is formed with a receiving guide lip 70 extending upward and over jaw lip 18. Intermediate the length of the lower shroud 68 is an enlarged shoulder 71 that serves as a limit or stop against which the user may position his hand and which functions as a safety stop so the hand is kept away from the cutting area of the device. The lip 70 slopes backward and upward to cover about a substantial portion of the tracks 22a and 24a. An upper and likewise insulating shroud part 72 is complementary to and fits about upper support 14. In its normal position, the upper covering shroud 72 covers the support 14, and extends downward over the body 12. It is flared as at 73 to encompass and also cover an extent of the upper portion of the lower insulating shroud 68.

The body 12 is formed with a bore 74. A dowel 76 is sized to fit in bore 74 and is slidable up and down therein. A biasing element or spring 78 on one end reacts against an enlarged shoulder 79 at the lower end of the dowel 76 while the spring 78 reacts against body part 12 at the top of the bore 74. In the configuration shown in FIG. 2, the spring 78 normally biases the dowel 76 downward, although it will be observed that when the dowel is in its downward position, a part 80 thereof extends and projects out of body 12. A through slot 82 is defined in the body 12 to receive a pin 84 that is fixed to the two opposite flared skirts of the shroud 72 at 86 and extends transversely through the slot to guide the shroud in its longitudinal movements. The shoulder of the dowel 76 rests and is supported on the pin 84 so both move up and down together.

The shroud 72 is secured to the pin 76 at the exposed projection 80 that is conveniently mounted in the cooperating bore 88 by a press fit, or threaded connection or even a loose connection. The force of the spring 78 is applied to the shoulder 79 which rests against the pin 84 to apply a constant downward force to the shroud 72. In this configuration, dowel 76, in conjunction with biasing element 78, spring loads the pin and hence upper shroud downwardly when looking at FIG. 2. Further, upper shroud 72 is formed with two spaced, contoured cable receiving lips 90 that, in elevation, extend over upper blade 26 and yet move relative thereto during operation of the inventive cutter as will now be described.

In operation, cutter device 10 is placed about the cable 92 to be cut by moving the device such that the cable or torquing of the shroud as the same moves relative to support 14 and body 12.

As the blades bite and cut into cable 92, slots 24a and 24b, and slots 22a and 22b guide and confine the edge regions of their respective blades 26 and 30. The perimetric blade constraint afforded by these slots acts to reduce blade deformation and increases cut accuracy when the cable is sheared. Moreover, the reactive thrust of blade 26 which is produced by the rake of cutting surface 32 is counteracted by the reactive thrust produced by the rake of cutting surface 34 of blade 30. Since the confronting edges of both blades 26 and 30 are contoured to approximate a crescent shape with sloping or angled knife walls to direct the cable to the deepest seating portion 96 of the blades and to impart a sliding action to reduce shearing forces and to minimize distortion of the cable, the opposed concave configurations tend to capture the cable and prevent its displacement or walking from between the blades during cable shearing. By providing the blades with the sloping knife walls, the same are initially engaged with the cable and guide the cable to the deepest cutting portion 96. At the same time, the sloping walls cut into the cable and begin their shearing of the same thereby minimizing the tendency of the cable to distort about its periphery and gradually but progressively cutting smoothly through the same. Pin 58 permits some degree of relative pivot of blade 30 to thereby lessen the lateral thrust on aperture 56.

After the cable is sheared and drops from engagement with lips 90, shroud 72 snaps back over blade 26 by the resilient action of spring 78 against pin 84 as noted above. Further, fluid pressure in line 50 is terminated and bled therefrom to allow spring 60 to retract piston 44 and hence blade 30 to the position seen in FIGS. 1 and 2.

While only a single embodiment of the present invention has been shown and described, it is apparent that many changes and modifications can be made hereto without departing from the spirit and scope thereof. It is the intention, therefore, to be limited only as indicated by the scope of the claims appended hereto.

What is claimed is:

1. A cable cutter comprising
   a housing having upper and lower supports,
   a blade in each of said supports with one of said blades movable relative to the other,
   each of said blades having cutting surfaces in planar wiping supporting relationship,
   moving means connected with said one blade to move the blade relative to the other to cut a cable therebetween,
   and shroud means covering said blades and a part of said shroud means being movable on said housing in response to the movement of said one blade against the cable and the cable against said part of said shroud to enable the cable to be cut between said blades.

2. A cable cutter as in claim 1,
   said cutting surfaces being substantially concave-shaped and having oppositely facing sloping knife surfaces angled to direct the cable to be cut thereby to the deepest portion of said blades to reduce shearing forces and to minimize cable distortion.

3. A cable cutter as in claim 1,
   biasing means between said shroud means and said housing normally to urge said part of said shroud means in covering relationship with said other blade and yieldable in response to a force applied thereto to enable said other blade to cut a cable between and with said one blade.

4. A cable cutter as in claim 3,
   track means on said housing supporting said blades for relative parallel movement such that said blades share a common shear plane along which they wipe each other.

5. A cable cutter as in claim 1,
   another part of shroud means normally covering said one blade, said shroud means being an electrical insulating material, and said movable part of said shroud means covering at least a portion of said other part of said shroud means.

6. A device to cut cables comprising a housing having relatively spaced upper and lower supports defining an opening therebetween through which a cable to be cut is positioned, a first blade in said upper support and a second blade in said lower support and relatively movable with respect thereto, shroud means including an upper shroud element on said upper support movable in and out of covering relationship with said first blade and a lower shroud element disposed essentially about said lower support and covering said second blade, and means to effect relative displacement of said first and second blades to cause pinching of a cable positioned in said opening between both of said blades while substantially simultaneously causing portions of the cable periphery to effect relative movement of said upper shroud element relative to said first blade.

7. A device as in claim 6, said upper and lower shroud elements being essentially complementary to their respective upper and lower supports normally to cover the same and with each of said upper and lower shroud elements being fabricated as electrical insulators.

8. A device as in claim 7, said means to effect relative displacement of said blades being fluid operated and being pivotally connected with said second blade to move the same relative to said first blade.

9. A device as in claim 6, guide means on said housing to guide the relative displacement of said first and second blades.

10. A cable cutter comprising a housing having track means to guide the relative movement of two cable cutting blades during their cutting of a cable therebetween, two blades mounted for relative movement on said housing and guided by said track means and being normally spaced from each other to define an opening therebetween through which a cable to be cut may be inserted between said blades to be cut thereby, means to cause said blades to move and scissor relative to each other and to a cable positioned therebetween to sever the cable, and dielectric shroud means including shroud elements normally covering said blades and at least one of said elements being displaceable relative to the other of said elements to uncover at least one of said blades to enable the same to cut the cable in response to the relative movement of said blades.

11. A cable cutter as in claim 10, said track means guiding said blade in side-by-side substantially parallel relative movement with portions of each of said blades being in wiping supporting relation during the cutting of the cable.

12. A cable cutter as in claim 10, yielding means connecting said one shroud element with said housing urging said one element into normal covering relation with said one blade and yieldable to enable said one element to move relative to said one blade.

13. A cable cutter as in claim 12, said means to cause said blades to move relative to each other being a fluid operated piston pivotally connected with one of said blades to move the same in said track means relative to the other blade.

* * * * *